Oct. 18, 1966   C. E. GRYCTKO   3,280,280
INTERLOCK DEFEATER FOR CURRENT LIMITING CIRCUIT BREAKERS
Filed Dec. 29, 1964   4 Sheets-Sheet 1
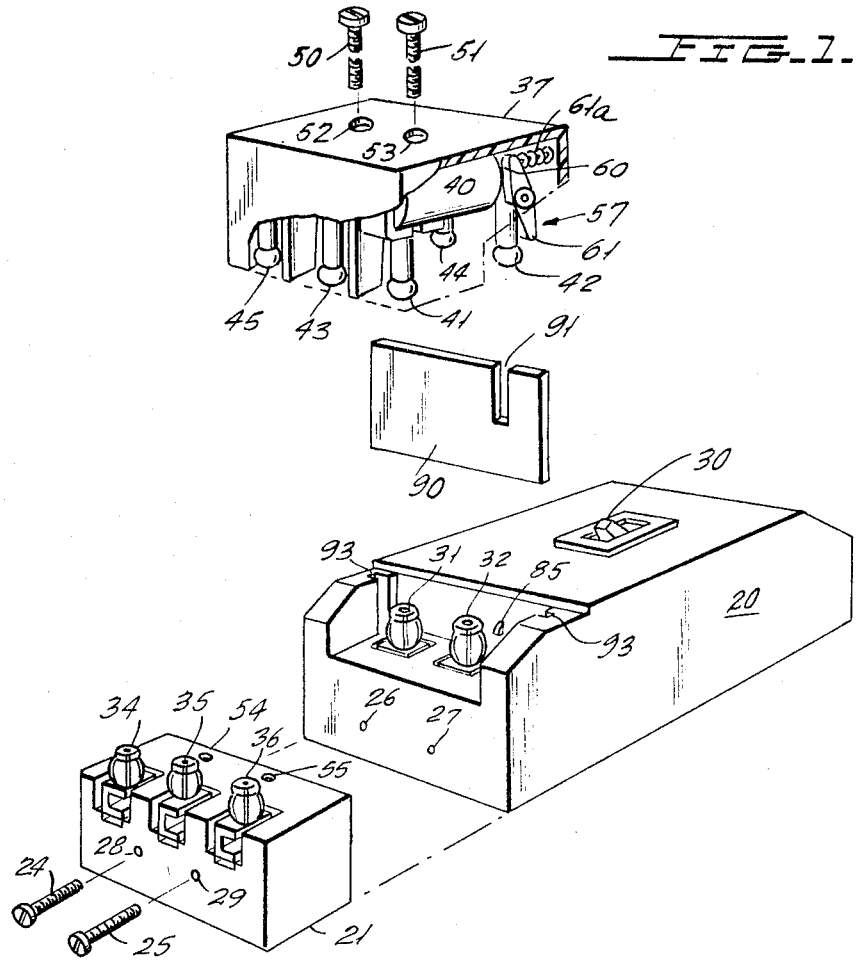
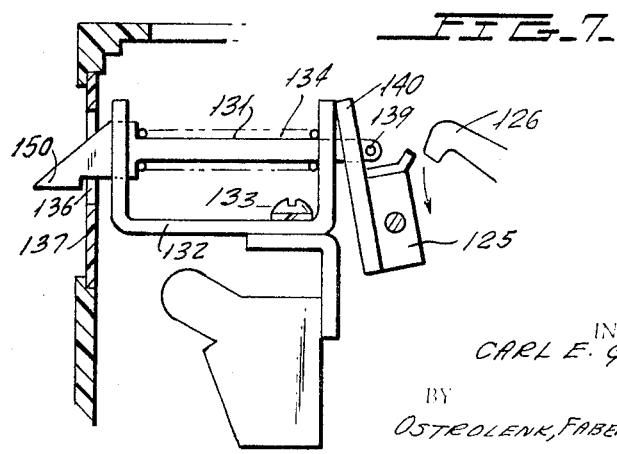
INVENTOR.
CARL E. GRYCTKO
BY
OSTROLENK, FABER, GERB & SOFFEN
ATTORNEYS

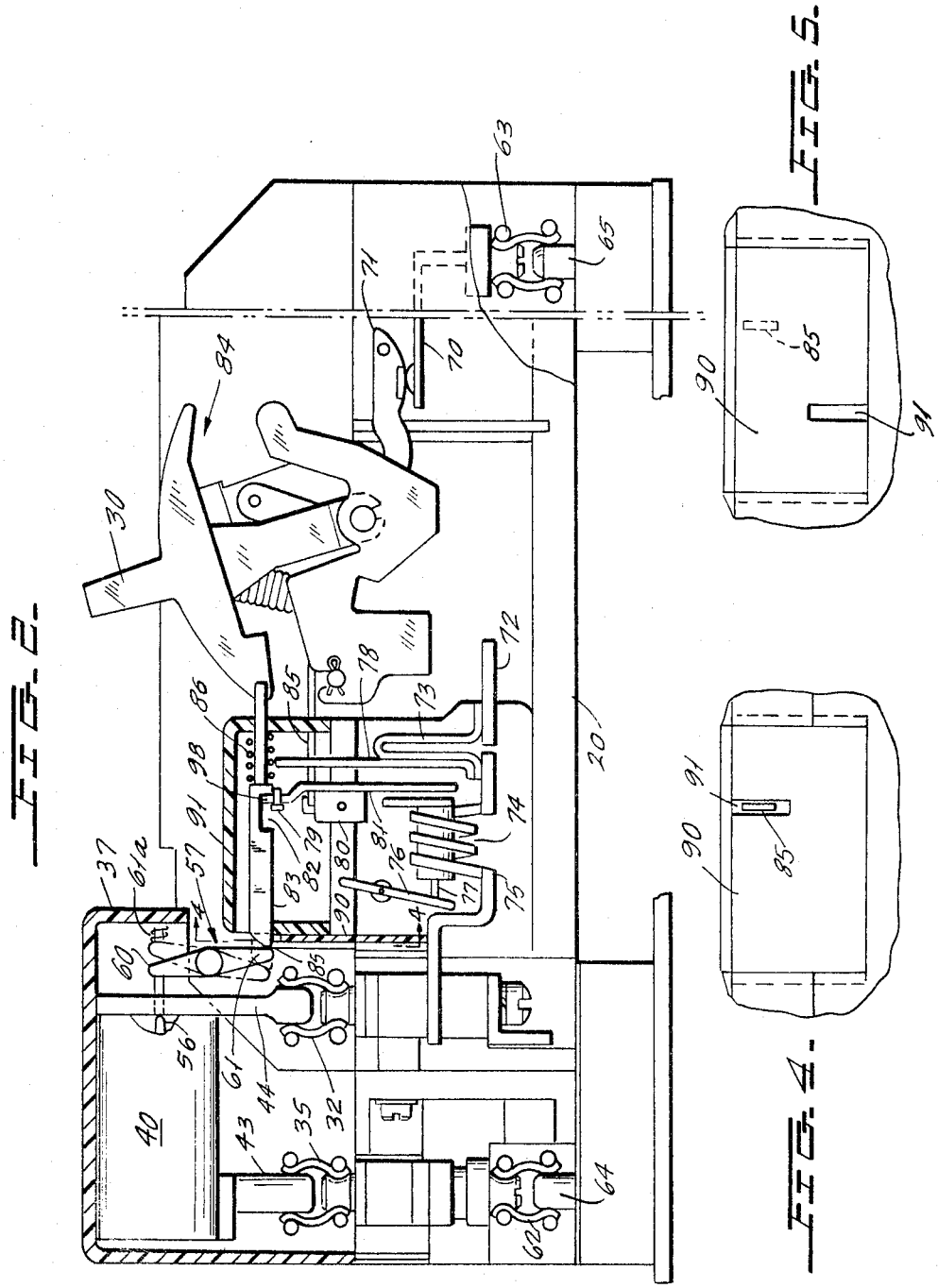

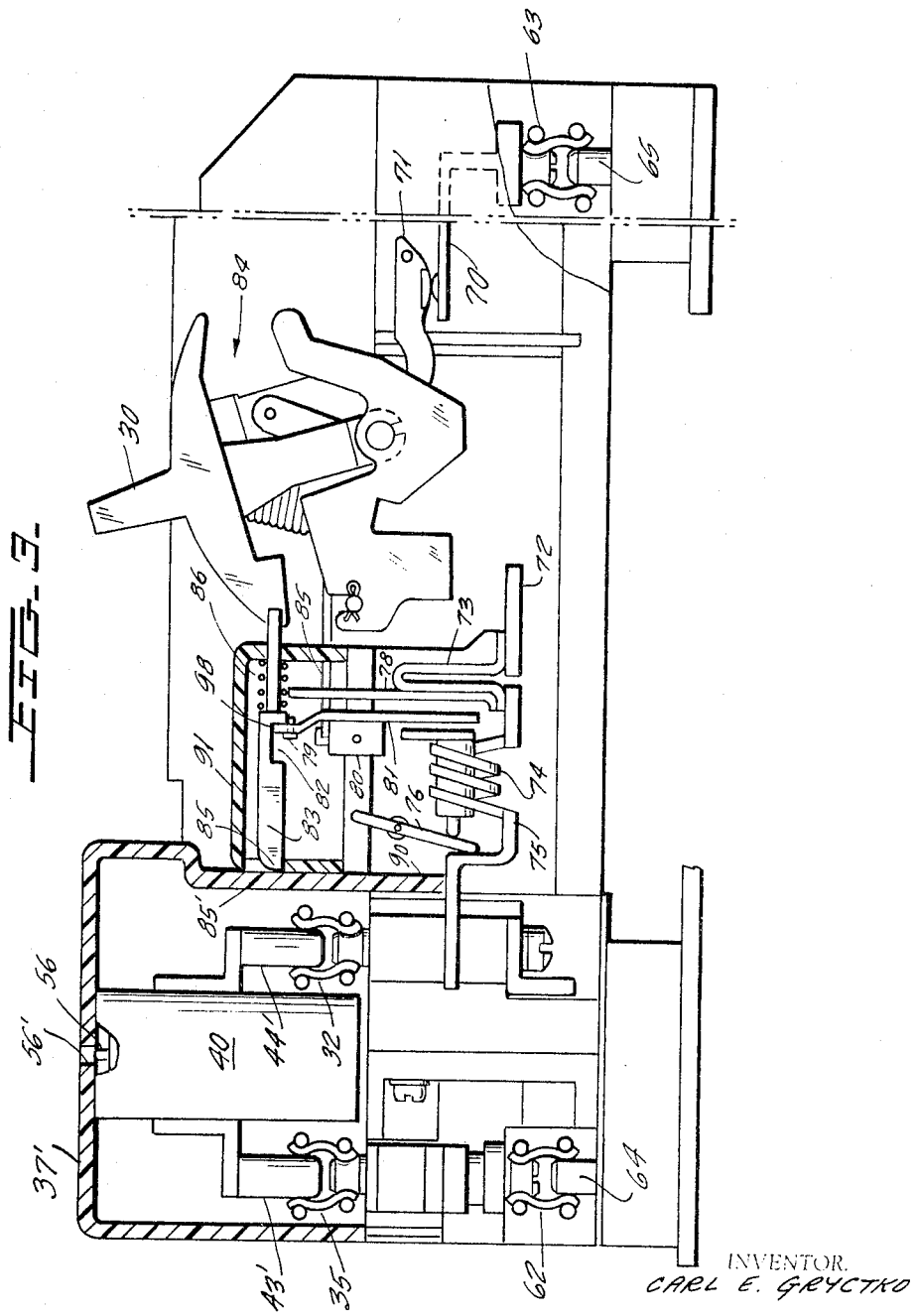

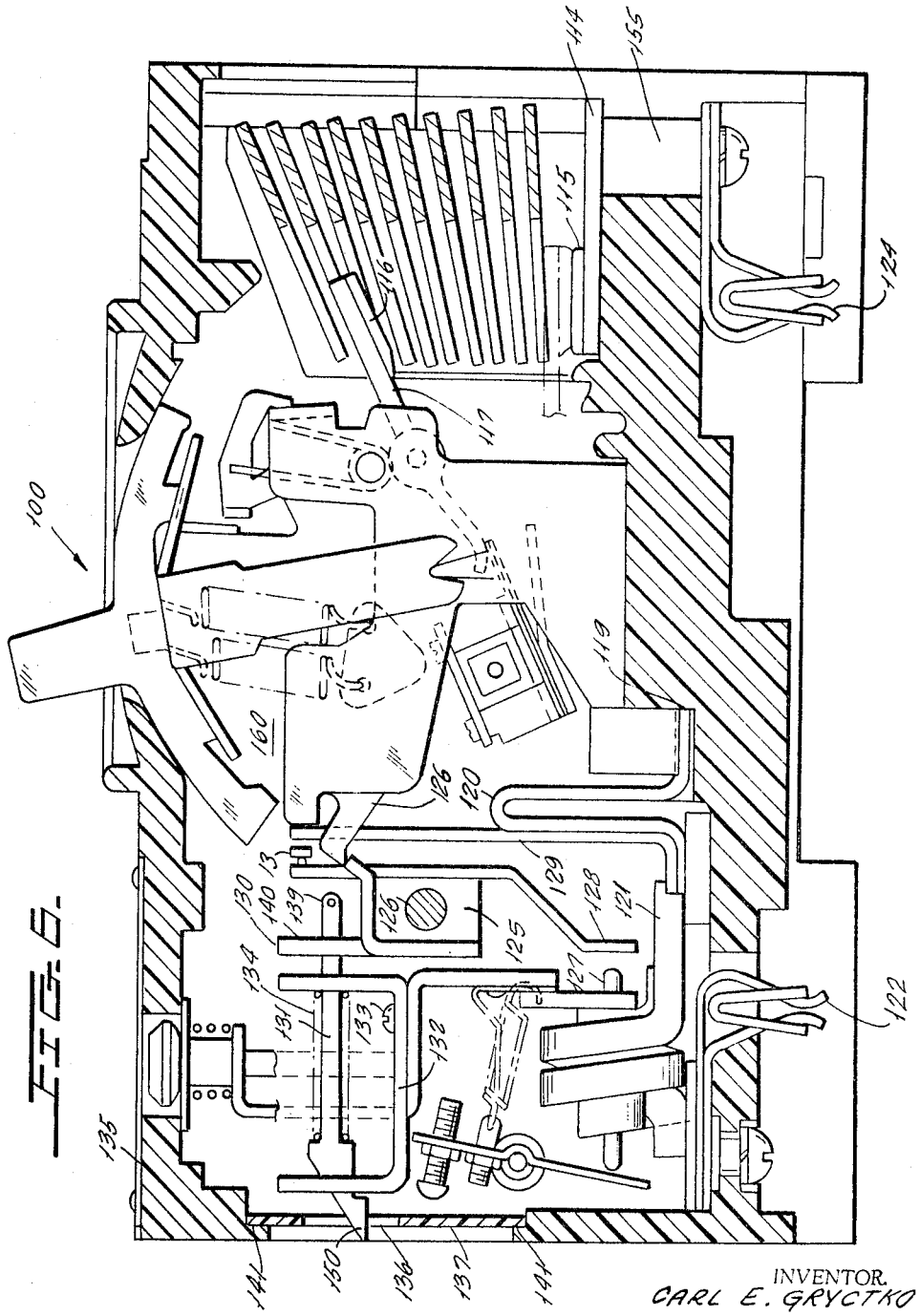

United States Patent Office 3,280,280
Patented Oct. 18, 1966

3,280,280
INTERLOCK DEFEATER FOR CURRENT
LIMITING CIRCUIT BREAKERS
Carl E. Gryctko, Haddon Heights, N.J., assignor to I-T-E
Circuit Breaker Company, Philadelphia, Pa., a corporation of Pennsylvania
Filed Dec. 29, 1964, Ser. No. 421,838
6 Claims. (Cl. 200—114)

My invention relates to interlock defeater arrangements for use in conjunction with a current limiting circuit breaker, and more particularly to a defeater means of the general type shown in U.S. Patent No. 2,924,689 (issued February 9, 1960 in the name of William Harold Edmunds, entitled Interlock Defeater for Trip Unit), but providing substantially increased accessibility and ease of operation.

The combination of a series connected circuit breaker and current limiting device is well known in the art, and is typically shown in above-mentioned U.S. Patent No. 2,924,689, as well as U.S. patent application of myself and William Harold Edmunds, Serial No. 357,138, filed April 3, 1964, entitled Housing and Interlock for Bolt Connected Current Limiting Fuses, both assigned to the assignee of the instant invention. In such arrangements the electrical and mechanical coordination between a current limiting device, such as a fuse, and a circuit breaker unit enables the use of a circuit breaker having a relatively low interrupting capacity, as compared to the short circuit capacity of the protected circuit. For all magnitudes of over-current and fault current within the range capable of being interrupted by the circuit breaker, the trip characteristics are such that the time delay bimetallic trip or the instantaneous magnetic trip thereof will initiate operation of the circuit breaker mechanism, such that the cooperating contacts of all poles thereof are moved to the disengaged position. However, should a severe short circuit occur, the magnitude of which may exceed the interrupting rating of the circuit breaker itself, the current limiting devices will be rapidly actuated, serving to interrupt the fault current associated with the phase in which it occurs. Such actuation may be accompanied with a visual indication serving to inform operating personnel of the severe short circuit condition. Further, and particularly in those situations where a multi-phase load is being protected, direct mechanical coordination may be provided whereby the rupture of the current limiting device of any one of the phases is operatively transmitted to the circuit breaker unit, to result in the simultaneous opening of the cooperating contacts in each pole of the circuit breaker mechanism.

The circuit breaker unit is typically contained within its own housing, with the current limiting devices being contained in a separable auxiliary housing. The two housings are mechanically and electrically interconnected to achieve the coordinated current limiting action therebetween.

The mechanical coordination between the circuit breaker unit and the auxiliary housing containing the current limiting devices is typically provided by an interlock member of the circuit breaker trip unit, which outwardly projects from the circuit breaker housing. The interlock member is actuated by the removal of the auxiliary housing containing the current limiting devices. This interlock may also engage a tripper bar within the auxiliary housing, actuated by the operation of the current limiting device.

To minimize duplication of parts, and especially the trip unit design, it is particularly desirable that the same basic circuit breaker mechanism may be used, either alone for normal operation, or in conjunction with the current limiting devices. In order to so permit the same circuit breaker unit to operate with and without the auxiliary current limiting devices, it is necessary that the outwardly projectable movement of the interlock member be defeated when the circuit breaker unit is to operate in its normal manner. It had been previously proposed in above-mentioned U.S. Patent No. 2,924,689 to provide such a defeat means by modifying the interlock member itself. Typically, a pin may be inserted in an aperture through the interlock bar, or a slidable collar movable along the length of the bar may be moved to a position whereat it serves to prevent the outward projection of the interlock from the circuit breaker housing. Such arrangements, while serving to effectively defeat the interlock, require accessibility of the interlock member located internally of the circuit breaker unit, and typically necessitate the disassembly of the circuit breaker to provide such accessibility. Although such modifications of the interlock member may be convenient in the factory while the unit is first assembled, subsequent changes of the circuit breaker unit in the field prior to actual use thereof require a cumbersome and many times intricate procedure for modifying the internally located interlock member. My invention is principally directed towards providing defeat of the outwardly projectable movement of the interlock in an extremely simplified and accessible manner, thereby avoiding the need for such internally located defeat means.

Specifically, I modify the circuit breaker housing itself, or a removable member associated therewith, at the region where the interlock outwardly projects, so as to either block the outward movement of the interlock when it is desired that the circuit breaker operate in its normal manner, or provide a passageway for the unobstructed outward movement of the interlock when it is desired that the interlock be mechanically coordinated with the housing or tripper bar of the associated current limiting devices. Such housing modifications may preferably be provided by a shield member suitably inserted in housing formations at the end of the circuit breaker through which the interlock member is to project. The shield member contains an aperture in off-center relationship with respect to the interlock location. When the shield is orientated in a particular manner, the aperture passageway thereof will be in alignment with the forward end of the interlock, to permit translation thereof external to the circuit breaker housing. With the shield member, however, reorientated in another manner, which may simply be provided by turning the shield around, a solid portion thereof will now be in alignment with the forward end of the interlock, and thereby serve as an abutment to prevent the outward movement of the interlock from the circuit breaker housing. Hence, by simply turning the easily accessible shield about, the interlock rod may be made selectably defeatable to prevent interlock operation.

It is accordingly a primary object of my invention to provide a novel defeater for the trip unit interlock of a coordinated circuit breaker and auxiliary current limiting device.

Another object of my invention is to provide for the defeat of an interlock rod outwardly projectable from the housing of a circuit breaker unit, by a preselectably disposed circuit breaker housing abutment in the path of outward movement of the interlock rod.

A further object of my invention is to provide a circuit breaker adaptable for operation in conjunction with an auxiliary current limiting device, including a preselectably disposed housing abutment means, having a first position wherein it permits the interlock rod of the current limiting circuit breaker to pass outward of the circuit breaker housing, and a second position wherein it blocks the movement of the interlock means, and thereby permits the circuit breaker trip unit to operate in the conventional manner.

An additional object of my invention is to provide a defeater means for the interlock of a mechanically coordinated circuit breaker unit, and auxiliary current limiting device, which is formed by an externally accessible portion of the circuit breaker housing.

These as well as other objects of my invention will become apparent upon a consideration of the following description when taken in conjunction with the drawings, in which:

FIGURE 1 is a perspective view of a circuit interrupting device, comprising a circuit breaker within a first housing and a current limiting device contained within an auxiliary housing, and including the novel interlock defeat arrangement of my invention, to selectively provide or prevent mechanical coordination therebetween.

FIGURE 2 shows a cross-sectional view through a single phase of one of the phases of FIGURE 1, and showing the interlock operable by either removal of the auxiliary housing or actuation of the current limiting device.

FIGURE 3 shows a cross-sectional view of a modified embodiment, corresponding essentially to that shown in FIGURE 2, but wherein the interlock is operable only upon removal of the auxiliary housing, and the actuation of the current limiting device providing a visual indication thereof.

FIGURE 4 is a cross-sectional view through lines 4—4 of FIGURE 2, looking in the direction of the arrows, and showing the manner in which the novel shield member of my invention is positioned to permit the outward travel of the interlock means for mechanical coordination between the circuit breaker unit and current limiting device.

FIGURE 5 is a view corresponding to FIGURE 4, but showing the shield member reorientated to defeat the mechanical coordination between the circuit breaker unit and current limiting device.

FIGURE 6 is a cross-sectional view of a second embodiment of my invention, corresponding essentially to that shown in FIGURE 2 or 3, but wherein a different circuit breaker mechanism is shown.

FIGURE 7 shows the trip unit of the circuit breaker of FIGURE 6 in the tripped position responsive to outward movement of the interlock rod.

Referring first to FIGURES 1 and 2, a circuit breaker housing 20 has an extension 21 connectible to one end thereof by means of screws such as 24 and 25, which pass through openings 28 and 29 respectively, for engagement with cooperating openings 26, 27 in the circuit breaker housing. Alternatively, if desired, extension 21 could be an integral part of the circuit breaker base, as is typically shown in above-mentioned copending application Serial No. 357,138.

Contained within circuit breaker housing 20 is an operating mechanism of any desired type, such as for example that shown in above-mentioned U.S. Patent No. 2,924,689, which is operable by operating handle 30 for operating a pair of contacts for each phase of the circuit breaker. Each of the pairs of contacts of each phase is then terminated on one side by disconnect contacts 31, 32 and a contact 33, which cannot be seen in FIGURE 1, respectively. The extension 21 provides additional disconnect contacts 34, 35 and 36 which cooperate with contacts 31, 32 and 33 respectively, for connecting a current limiting device in series with each of the circuit breaker phases. Current limiting devices for each of the circuit breaker phases are housed within auxiliary housing 37.

These current limiting devices may typically be the well known expedient of individual fuses, such as 40, in each of the phases. Fuse 40 of one of the phases is connected to its corresponding phase by connection of disconnect contacts 41 and 42, which engage tulip type contacts 36, 33 respectively. In a similar manner disconnects 43, 44 of the fuse device provided for the center phase operate with disconnect contacts 35, 32, with the disconnect 45 and its cooperating contact at the other side of the fuse (not shown) similarly engaging tulip type contacts 34, 31. The assembled housing 37 is connected to the circuit breaker housing by screws 50, 51, which pass through apertures 52, 53 respectively of auxiliary housing 37 and into cooperating apertures 54, 55 of the housing extension 21.

In the assembly shown in FIGURES 1 and 2, the actuation of the current limiting device associated with any one of the poles is transmitted to an auxiliary tripper bar 57 pivotally mounted within auxiliary housing 37. Auxiliary tripper bar 57 has an extension such as 60 to be engaged by the striker pin 56 of the current limiting fuse 40, as well as a lower extension 61, which is biased into operative engagement with the forward end 85 of interlock rod 83.

FIGURE 2 shows a cross-sectional view of the assembled components of FIGURE 1, when taken through one of the phases and showing the shield member 90 positioned, as shown in FIGURES 1 and 4, to permit outward movement of the interlock rod 83 for engagement with tripper bar 57. Alternatively, as shown in FIGURE 3, the forward end 85 of the interlock rod 83 may abut solid wall portion 85' of its auxiliary housing 37'. The current limiting device 40 is shown orientated such that its striker pin 56 is projectible through auxiliary housing aperture 56' to provide a visual indication of its actuation. Current limiting device 40 is electrically connected to its corresponding phase by disconnect contacts 43', 44' which engage tulip-type contacts 32, 35 in a manner analogous to that shown in FIGURE 2.

The operating mechanism of the circuit breaker shown in FIGURES 2 and 3 is typically of the type shown in above-mentioned U.S. Patent No. 2,924,689. The current path of the phase shown includes stud 65, circuit breaker tulip clip contact 63, stationary contact 70, movable contact of contact arm 71, a pigtail (not shown), which connects contact arm 71 to conductor 72, heater 73, coil 74, conductor 75, tulip-clip contact 32, disconnect stud 44, current limiting fuse 40, disconnect stud 43, tulip-clip contact 35, tulip-clip contact 62 and stud 64. Coil 74 has a pivotally mounted armature 76 and a plunger 77 associated therewith, these components comprising the instantaneous magnetic trip unit. Heater 73 has an elongated bimetal 78 and adjusting screw 79 associated therewith, these components comprising the thermal trip unit.

A tripper bar 80 has a member 81 fastened thereto which carries adjusting screw 79 in cooperating alignment with bimetal 78 and is self-aligned with respect to plunger 77. Member 81 has an end 98 thereof protruding into slot 82 of trip rod 83 and is rotatable in a counter-clockwise direction within slot 82.

The operating mechanism 84 has a latch member 85 connected thereto and constructed to be latched by tripper bar 80. When tripper bar 80 is rotated in a counter-clockwise direction, however, latch member 85 will be unlatched to allow mechanism 84 to disengage the circuit breaker cooperating contacts of each phase, in the well-known manner.

In the event of a prolonged overload, heater 73 will cause bimetal 78 to deflect into engagement with screw 79 to cause counter-clockwise rotation of tripper bar 80 and tripping of the circuit breaker contacts. Under fault conditions, coil 74 will create a strong magnetic field to cause armature 76 to drive plunger 77 into engagement with member 81, thus rotating tripper bar 80 counter-clockwise to effect instantaneous tripping of the circuit breaker contacts.

A shield member 90 having elongated apertured passageway 91 is seated within cooperating housing formation 93 of the circuit breaker housing 20, such that aperture 91 will be in alignment with the forward end 85 of the interlock rod member (as shown in FIGURE 4), thereby permitting the outward projecting of the interlock rod member, from the circuit breaker housing 20. Shield member is readily accessible, and in accordance with the novel aspects of my invention, shield member 90 may be removed and turned about, as for example 180°, such that a solid portion therof will then be in abutting engagement with the forward end 85 of the interlock rod 83 (see FIGURE 5) and thereby prevent outward projection of the interlock rod. As will be subsequently discussed in greater detail, when so positioned the shield member acts as an interlock defeater, permitting operation of the circuit breaker unit 20 in the normal manner, without mechanical and electrical coordination, with the current limiting devices of housing 37.

In addition to the thermally or electromagnetically induced operation of the circuit breaker trip unit, shown in FIGURES 1 and 2, it is also mechanically coordinated to automatically respond to the instantaneous current limiting operation of the fuse device 40. A striker pin 56 of the fuse 40 is brought into engagement with extension 60 of the auxiliary tripper bar 57 causing the auxiliary tripper bar to rotate clockwise against the biasing force of spring 61a. This rotation will then permit end 85 of interlock tripper rod 83 to outwardly move (through aperture 91 of the shield member) under the influence of biasing spring 86. The movement to the left as shown in FIGURE 2 of interlock tripper rod 83 causes extension 98 of trip member 81, within slot 82, to be moved to the left, thereby rotating tripper bar 80 within the circuit breaker trip unit counter-clockwise to release the latch member 85, and thereby simultaneously open the cooperating contacts of each of the phases.

It should also be noted that the same action would be obtained if the fuse housing 37 of FIGURES 1 and 2, or 37' of FIGURE 3 were removed from the circuit breaker housing 20. That is, either extension 61 of tripper bar 57 or housing portion 85' would be removed from its abutting engagement with tip 85 of interlock trip rod 83 to allow subsequent rotation of tripper bar 80.

Hence, in these constructions wherein the fuse housing 37 or 37' is connected at the end of circuit breaker housing 20, the circuit breaker cooperating contact will be disengaged responsive to removal of the auxiliary fuse housing.

In order to defeat this coordinated operation between the auxiliary current limiting devices or their housing and the circuit breaker tripper bar 80, I prevent the outward movement of the forward end 85 of interlock tripper bar 83 in an extremely simple manner. Specifically, the removable shield member 90 of the circuit breaker unit includes an aperture 91 in an off-center relationship with respect to the path of outwardly projectible interlock trip 85. As shown in cross-sectional FIGURES 2 and 4, the forward end 85 of the interlock tripper rod 85 will be in alignment with aperture 91 when coordinated current limiting operation is desired. Hence, the aperture serves as a passageway permitting the movement of the forward end 85 outward of the circuit breaker housing 20, and into engagement with the current limiting devices of housing 37. Should it be desired to operate circuit breaker 20 in the conventional manner, the outward projection of forward end 85 of the interlock tripper rod 83, may be defeated by the simple expedient of turning the shield member about, as shown for example in FIGURE 5, such that aperture 91 is no longer in alignment with the forward end 85 of the interlock tripper bar (shown dotted).

Hence, the circuit breaker may be converted from current limiting coordinated operation, as shown in FIGURES 2 or 3, to normal operation by the simple expedient of removing shield 90, rotating it about, and then reinserting it in the circuit breaker, while holding the forward end 85 of the interlock member back. In actual practice circuit breaker 20 could be supplied as a standard unit, with the shield positioned as in FIGURE 5, and conversion to a current limiting type operation being effected by the reversal of the above-described simple procedure. In order that there be no exposed opening when the circuit breaker 20 is operated in the normal manner, the shield 90 may be made with a scored outline that may be easily broken away to form the slot-like opening 91 for the interlock rod 83 when the shield is reversed for operation with housing 37.

Reference is now made to FIGURE 6, which shows my novel interlock defeat means being used in conjunction with a somewhat different circuit breaker operating mechanism, of the general type shown in copending U.S. patent application Serial No. 340,036, filed January 24, 1964, of myself and John C. Brumfeld, entitled Stop Means for Contact Arm, now U.S. Patent No. 3,239,638, and assigned to the assignee of the instant invention.

The current path for each phase of circuit breaker 100 proceeds from line terminal 124, conductor 155, line terminal strap 114, stationary contact 115, movable contact 116, contact arm 117, a braided conductor (not shown) to bracket 119, inverted U-shaped bimetal heater 120, magnetic trip means winding 121, and load terminal connector 122.

The circuit breaker tripper bar 125 is rotatable counter-clockwise about pivot 126 by actuation of plunger 127 of the magnetic trip to engage portion 128 thereof, or by deflection of bimetal 129 into adjusting screw 130 thereof in the well-known manner, with such counter-clockwise movement of tripper bar 125 serving to release latch member 126 of the operating mechanism generally shown as 160 for simultaneous disengagement of the cooperating contacts of each of the phases.

The tripper bar 125 may also be operated by the actuation of an externally located current limiting unit (not shown), with the mechanical coordination therebetween provided by an interlock trip rod 131. The interlock rod 131 is contained within generally U-shaped bracket 132, suitably mounted as by means of single screw 133, to a cooperating formation of the circuit breaker housing (not shown). The forward end 150 of interlock tripper rod 131 is outwardly biased by spring 134 to project external of the circuit breaker housing 135, via apertured opening 136 of removable shield member 137; shield member 137 being sealed in housing formation 141. The interlock rod member 131 contains a transverse pin 139 at its opposite end, which engages upward extension 140 of trip unit 125 upon movement to the left, as shown in FIGURE 6, of interlock rod member 131. Such movement to the left serves to rotate tripper bar 125 counter-clockwise, disengaging the latching 126 of the circuit breaker operating mechanism, as shown in FIGURE 7.

In accordance with the novel aspects of my invention, defeat of interlock rod 131 is provided by reorientating shield member 137 within its cooperating housing formation 141, such that its opening 136 will be in non-alignment with respect to the outward path of movement of the interlock rod 131. By means of the off-center relationship of aperture 136, a solid portion of the shield member 137 will then abut the interlock rod end 150 and thereby prevent its outward movement. When so defeated, circuit breaker unit 100 will operate in the conventional manner, with the disengagement of its cooperating contacts through the tripper bar 125 being provided only by the thermal or electromagnetic trips.

It is, therefore, seen that my invention provides an interlock defeater arrangement of increased accessibility, thereby facilitating the manner in which a single trip unit may be converted to operate as either a normal circuit breaker within the current rating capacities of its circuit breaker device, or in conjunction with current limiting devices, to extend its operation into circuits having substantally greater short circuit capacities than the circuit breaker rating.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. In a circuit breaker, a housing containing a pair of cooperable contacts, a trip means and a trip unit; said trip means being operatively connected to said cooperable contacts, said cooperable contacts being movable from an engaged to a disengaged position responsive to operation of said trip means; said trip unit operatively connectible to said trip means for actuation thereof; said trip unit comprising current responsive means for operating said trip means responsive to fault conditions below a predetermined magnitude and an interlock means projectible outward of said housing to engage means, responsive to predetermined conditions of a current limiting structure; said interlock means having a first position substantially confined within said housing and a second position, at least partially projecting outward of said housing, said first position providing a non-correction of said interlock means and said trip means, said second position providing an operative connection between said interlock means and trip means, to operate said cooperable contacts to their disengaged position; and defeater means to prevent movement of said interlock means to said second position; said defeater means comprising a preselectibly disposed wall portion of said housing in the path of outward movement of said interlock means; said defeater housing wall portion having a first position permitting the outward movement of said interlock means to said second position, and a second position wherein said housing abutment prevents movement of said interlock means external to said housing; said defeater housing wall portion when in said second position allowing said trip unit to function as a normal circuit breaker, and in said first position as a circuit breaker adapted to operate in conjunction with an externally located current limiting structure.

2. In a circuit breaker, a housing containing a pair of cooperable contacts, a trip means and a trip unit; said trip means being operatively connected to said cooperable contacts, said cooperable contacts being movable from an engaged to a disengaged position responsive to operation of said trip means; said trip unit operatively connectible to said trip means for actuation thereof; said trip unit comprising current responsive means for operating said trip means responsive to fault conditions below a predetermined magnitude and an interlock means projectible outward of said housing to engage means, responsive to predetermined conditions of a current limiting structure; said interlock means having a first position substantially confined within said housing and a second position, at least partially projecting outward of said housing, said first position providing a non-connection of said interlock means and said trip means, said second position providing an operative connection between said interlock means and trip means, to operate said cooperable contacts to their disengaged position; and defeater means to prevent movement of said interlock means to said second position; said defeater means comprising a housing member containing an apertured passageway; said housing member having a first position wherein said apertured passageway is in alignment with the path of outward movement of said interlock means; and a second position wherein a solid portion of said housing member is in said path to abuttingly prevent outward movement of said interlock means external to said housing; said defeater means when in said second position allowing said trip unit to function as a normal circuit breaker, and in said first position as a circuit breaker adapted to operate in conjunction with an externally located current limiting structure.

3. In a circuit breaker, a housing containing a pair of cooperable contacts, a trip means and a trip unit; said trip means being operatively connected to said cooperable contacts, said cooperable contacts being movable from an engaged to a disengaged position responsive to operation of said trip means; said trip unit operatively connectible to said trip means for actuation thereof; said trip unit comprising current responsive means for operating said trip means responsive to fault conditions below a predetermined magnitude and an interlock means projectible outward of said housing to engage means, responsive to predetermined conditions of a current limiting structure; said interlock means having a first position substantially confined within said housing and a second position, at least partially projecting outward of said housing, said first position providing a non-connection of said interlock means and said trip means, said second position providing an operative connection between said interlock means and trip means, to operate said cooperable contacts to their disengaged position; and defeater means to prevent movement of said interlock means to said second position; said defeater means comprising a housing member containing an apertured passageway; said housing member having a first position wherein said apertured passageway is in alignment with the path of outward movement of said interlock means; and a second position wherein a solid portion of said housing member is in said path to abuttingly prevent outward movement of said interlock means external to said housing; said housing member is an externally accessible shield member; said circuit breaker housing having a formation for snugly receiving said shield member in either a first or second orientation; said apertured passageway off-center located in said shield member, whereby said first orientation locates said apertured passageway in the path of outward movement of said interlock means and said second orientation locates said apertured passageway remote from said path of outward movement of said interlock means, said shield member when in said second orientation abuttingly locating a solid portion thereof in the path of outward movement of said interlock means; said shield member when in said second orientation allowing said trip unit to function as a normal circuit breaker, and in said first position as a circuit breaker adapted to operate in conjunction with an externally located current limiting structure.

4. In a circuit breaker as set forth in claim 3, said shield member is substantially planar, and lies in the same plane when in said first and second orientation; said first and second orientations corresponding to a 180° displacement of said apertured passageway.

5. In a multiphase circuit breaker comprising a housing containing a pair of cooperable contacts for each phase and a trip means, said trip means being operatively connected to each of said pairs of cooperable contacts, each of said pairs of cooperable contacts being movable from an engaged position to a disengaged position responsive to operation of said trip means; a trip unit for operating said trip means; said trip unit comprising overload and instantaneous trip mechanism operatively connectible to said trip means for operating said trip means responsive to an overload for a predetermined time and for faults below a predetermined magnitude respectively; said trip unit being further comprised of an interlock means operatively connectible to said trip means and being movable to operate said trip means; said interlock means projectible outward of said housing, and being constructed to operate said trip means through said operative connection responsive to predetermined conditions of a current limiting device externally connected to said circuit breaker housing; said interlock means having a first position substantially confined within said housing, and a second position, at least partially projecting outward of said housing, said first position providing a non-connection of said interlock means and said trip means, said second position providing an operative connection between said interlock means and trip means, to operate said cooperable contacts to their disengaged position; and defeater means to prevent movement of said interlock means to said second position; said defeater means comprising a housing member containing an apertured passageway; said housing member having a first position wherein said apertured passageway is in alignment with the path of outward movement of said interlock means; and a second position wherein a solid portion of said housing member is in said path to abuttingly prevent outward movement of said interlock means external to said housing; said defeater means when in said second position allowing said trip unit to function as a normal circuit breaker, and in said first position as a circuit breaker adapted to operate in conjunction with an externally located current limiting device.

6. In a circuit breaker having a pair of cooperable contacts and disconnect means for connecting a current limiting device having auxiliary trip means in series with said disconnect contacts; said circuit breaker having a trip means operatively connected to said cooperable contacts, a trip unit for operating said trip means; said trip unit comprising thermal and magnetic tripping mechanism operatively connectible to said trip means; said trip unit being further comprised of an interlock means and being movable to operate said trip means; said interlock means being constructed to operatively connect said trip means and the auxiliary trip means of a current limiting device when said current limiting device is connected by said disconnect means, whereby said trip means is operated responsive to operation of said auxiliary trip means; a first housing containing said cooperable contacts and trip means; a second housing containing said current limiting device and auxiliary trip means; said interlock means supported within said first housing and projectible from said first to second housing for operatively connecting said auxiliary trip means to said trip means; said interlock means having a first position substantially confined within said first housing, and a second position, at least partially projecting outward of said first housing, said first position providing a non-connection of said interlock means and said trip means, said second position providing an operative connection between said interlock means and trip means, to operate said cooperable contacts to their disengaged position; and defeater means to prevent movement of said interlock means to said second position; said defeater means comprising a first housing member containing an apertured passageway; said housing member having a first position wherein said apertured passageway is in alignment with the path of outward movement of said interlock means; and a second position wherein a solid portion of said housing member is in said path to abuttingly prevent outward movement of said interlock means external to said housing; said housing member is an externally accessible shield member of said first housing; said first housing having a formation in a wall adjacent said second housing for snugly receiving said shield member in either a first or second orientation; said apertured passageway off-center located in said shield member, whereby said first orientation locates said apertured passageway in the path of outward movement of said interlock means and said second orientation locates said apertured passageway remote from said path of outward movement of said interlock means, said shield member when in said second orientation abuttingly locating a solid portion thereof in the path of outward movement of said interlock means; said shield member when in said second orientation allowing said trip unit to function as a normal circuit breaker, and in said first position as a circuit breaker adapted to operate in conjunction with an externally located current limiting device.

References Cited by the Examiner
UNITED STATES PATENTS 2,924,689    2/1960    Edmunds _____ 200—116

BERNARD A. GILHEANY, *Primary Examiner.*

H. A. LEWITTER, *Assistant Examiner.*